United States Patent
Gray (10) Patent No.: US 11,278,988 B2
(45) Date of Patent: Mar. 22, 2022

(54) ADDITIVE MANUFACTURING METHOD USING LARGE AND SMALL BEAM SIZES

(71) Applicant: EOS OF NORTH AMERICA, INC., Pflugerville, TX (US)

(72) Inventor: Damien Francis Gray, Austin, TX (US)

(73) Assignee: EOS OF NORTH AMERICA, INC., Pflugerville, TX (US)

( * ) Notice: Subject to any disclaimer, the term of this patent is extended or adjusted under 35 U.S.C. 154(b) by 247 days.

(21) Appl. No.: 15/380,652

(22) Filed: Dec. 15, 2016

(65) Prior Publication Data
US 2017/0173736 A1 Jun. 22, 2017

Related U.S. Application Data

(60) Provisional application No. 62/268,849, filed on Dec. 17, 2015.

(51) Int. Cl.
| | |
|---|---|
| *B23K 9/04* | (2006.01) |
| *B23K 26/342* | (2014.01) |
| *B33Y 10/00* | (2015.01) |
| *B33Y 30/00* | (2015.01) |
| *B23K 26/082* | (2014.01) |
| *B29C 64/282* | (2017.01) |

(Continued)

(52) U.S. Cl.
CPC ............ *B23K 26/342* (2015.10); *B22F 12/00* (2021.01); *B23K 26/082* (2015.10);
(Continued)

(58) Field of Classification Search
CPC .......... B22F 2003/1056; B22F 3/1055; B23K 26/08; B23K 26/082; B23K 26/34; B23K 26/342; B29C 64/10; B29C 64/106–118; B29C 64/129; B29C 64/135; B29C 64/41; B29C 64/147; B29C 64/153; B29C 64/282; B29C 64/20; B29C 64/205–223; B29C 64/264; B29C 64/268; B29C 64/273; B29C 64/277; B29C 64/291; B33Y 10/00; B33Y 30/00; B33Y 40/00; B33Y 70/00; B33Y 80/00
(Continued)

(56) References Cited

U.S. PATENT DOCUMENTS

| | | |
|---|---|---|
| 4,863,538 A | 9/1989 | Deckard |
| 5,132,143 A | 7/1992 | Deckard |

(Continued)

*Primary Examiner* — Sang Y Paik
(74) *Attorney, Agent, or Firm* — Whitaker Chalk Swindle & Schwartz PLLC; Enrique Sanchez, Jr.

(57) ABSTRACT

Additive manufacturing method includes providing first and second scanners having first and second overlapping fields of view, applying a layer of powder-based materials to a part bed, providing a laser source for each scanner, each laser source producing a laser beam, and directing its laser beam to its scanner. A first laser beam from the first scanner pre-heats the powder-based material along a tool path in a selected pattern, and a second laser beam from the second scanner melts the pre-heated powder-based material along a second tool path. The first laser beam may be a pre-heat beam, and the second laser beam may be a melt beam. An additive manufacturing system includes a laser source, first and second scanners to receive a pre-heat laser beam to pre-heat a portion of material in the part bed, and a melt laser beam to melt a portion of the pre-heated material to form a part layer.

21 Claims, 5 Drawing Sheets

(51) Int. Cl.
  *B29C 64/153* (2017.01)
  *B29C 64/268* (2017.01)
  *B22F 12/00* (2021.01)
  *B22F 10/10* (2021.01)
(52) U.S. Cl.
  CPC .......... *B29C 64/153* (2017.08); *B29C 64/268* (2017.08); *B29C 64/282* (2017.08); *B33Y 10/00* (2014.12); *B33Y 30/00* (2014.12); *B22F 10/10* (2021.01); *Y02P 10/25* (2015.11)
(58) Field of Classification Search
  USPC ...... 219/76.1, 121.12–121.32; 264/400, 405, 264/409–412, 497, 482
  See application file for complete search history.

(56) References Cited

U.S. PATENT DOCUMENTS

| | | | |
|---|---|---|---|
| 5,393,482 A | 2/1995 | Benda et al. | |
| 5,427,733 A | 6/1995 | Benda et al. | |
| 5,508,489 A | 4/1996 | Benda et al. | |
| 5,530,221 A | 6/1996 | Benda et al. | |
| 6,007,764 A * | 12/1999 | Benda | B22F 3/1055 419/7 |
| 6,815,636 B2 | 11/2004 | Chung et al. | |
| 8,502,107 B2 | 8/2013 | Uckelmann | |
| 9,314,972 B2 | 4/2016 | Green | |
| 9,849,543 B2 | 12/2017 | Scott et al. | |
| 2010/0125356 A1* | 5/2010 | Shkolnik | G06T 1/00 700/98 |
| 2012/0237745 A1* | 9/2012 | Dierkes | A61K 6/0215 428/215 |
| 2013/0270750 A1* | 10/2013 | Green | B22F 3/1055 264/497 |
| 2014/0314964 A1* | 10/2014 | Ackelid | B05D 3/068 427/496 |
| 2014/0348691 A1* | 11/2014 | Ljungblad | B22F 3/1055 419/53 |
| 2015/0004045 A1* | 1/2015 | Ljungblad | B22F 3/1035 419/47 |
| 2017/0304894 A1* | 10/2017 | Buller | B22F 3/105 |
| 2017/0361405 A1 | 12/2017 | Renz et al. | |

\* cited by examiner

ADDITIVE MANUFACTURING METHOD USING LARGE AND SMALL BEAM SIZES

CROSS REFERENCE TO RELATED APPLICATION(S)

The present application claims the benefit of U.S. Provisional Patent Application Ser. No. 62/268,849 entitled ADDITIVE MANUFACTURING METHOD USING LARGE AND SMALL BEAM SIZES which was filed on Dec. 17, 2015, the contents of which are incorporated by reference in its entirety.

BACKGROUND

The present disclosure relates to additive manufacturing systems and processes for printing or otherwise building three-dimensional (3D) parts with layer-based, additive manufacturing techniques. In particular, the present disclosure relates to systems and methods for building 3D parts with an additive manufacturing system that uses a plurality of directed energy beams to selectively sinter or melt layers of powder-based material in a layer-by-layer manner.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is incremented along a z-axis (perpendicular to the x-y plane), and the process is repeated to form a 3D part resembling the digital representation.

In another example, in a stereolithography-based additive manufacturing system, a 3D part may be printed from a digital representation of the 3D part in a layer-by-layer manner by tracing a laser beam across a vat of photocurable resin. For each layer, the laser beam draws a cross-section for the layer on the surface of the liquid resin, which cures and solidifies in the drawn pattern. After the layer is completed, the system's platform is lowered by a single layer increment. A fresh portion of the resin may then recoat the previous layer, and the laser beam may draw across the fresh resin to pattern the next layer, which joins the previous layer. This process may be repeated for each successive layer. Afterwards, the uncured resin may be cleaned, and the resulting 3D part may undergo subsequent curing.

In yet another example, in a selective laser sintering (SLS) based additive manufacturing system, a 3D part may be printed from a digital representation of the 3D part in a layer-by-layer manner by tracing a laser beam across a part bed containing a layer of powder-based build material. For each layer, the laser beam draws a cross-section for the layer on the surface of the powder layer, which sinters or melts and solidifies the drawn pattern. After the layer is completed, the system's platform or part bed is lowered by a single layer increment. A fresh layer of powder-based build material may then be applied to cover the previous layer, and the laser beam may draw across the fresh layer of powder to pattern the next layer, which is also sufficiently joined to the previous layer. This process may be repeated for each successive layer. Afterwards, the powder not processed by the laser is simply brushed away or removed when the 3D part is removed from the part bed and the resulting 3D part may undergo subsequent processing or cleaning.

SUMMARY

An aspect of the present disclosure is directed to a method of additive scanner for building a three-dimensional part in a part bed including providing a first scanner having a first field of view and providing a second adjacent scanner having a second field of view overlapping the first field of view and wherein the first and second scanners are positioned at a selected height above the part bed. The method includes applying a layer of one or more powder-based materials onto or over the part bed. A laser source for each scanner is configured to produce a laser beam and to direct its laser beam to its corresponding scanner. A first laser beam is directed from the first scanner to pre-heat the powder-based material based on a sliced layer of a digital model for the three-dimensional part along a first tool path in a first selected pattern. A second laser beam is directed from the second scanner to melt the pre-heated powder-based material along a second tool path in a second selected pattern to produce a layer of the three-dimensional part.

Another aspect of the present disclosure is directed to a method of additive manufacturing for building a three-dimensional part in a part bed. The method includes pre-heating an area of a powder-based material in the part bed, with a first laser beam directed by a first scanner and having a first spot size along a selected pattern of a layer of the three-dimensional part. The method includes melting a subset of the area of pre-heated powder-based material, using a second laser beam directed by a second scanner and having a second spot size, along the selected pattern of the layer of the three-dimensional part.

Another aspect of the present disclosure is directed to an additive manufacturing system including a first laser source to generate a first laser beam and a second laser source to generate a second laser beam. A first scanner directs the first laser beam and a second scanner directs the second laser beam. The directed first and second laser beams are directed to a part bed, wherein the first laser beam is at a first energy level per unit area sufficient to pre-heat powder-based material in the part bed to a temperature near but below its melting temperature, and wherein the second laser beam is at a second energy level per unit area sufficient to melt the pre-heated powder-based material to form a layer of the part.

Other aspects of the present disclosure include a method of manufacturing a 3D part in a layer by layer manner utilizing a first pre-heating laser beam having a first spot size, and a second melting laser beam having a second spot size, the first and second spot sizes being the same, or the second spot size being smaller than the first spot size. The method includes directing the first, pre-heating laser beam from a first scanner and directing the second, melting laser beam from a second scanner along the same tool path. An area of the part bed covered by the second spot size in one aspect is entirely within an area of the part bed covered by the first spot size. The one or more powder-based materials may comprise plastic, ceramic, or metal.

DETAILED DESCRIPTION

Selective Laser Sintering (SLS) systems utilize a laser beam to sinter areas of a layer of loosely compacted powder, the powder being applied layer-by-layer on a substrate or previous layer of part material in a part bed. The term "sintering" as used herein after refers to the process by which the powder particulates are melted or otherwise caused to adhere into a solid mass of a selected shape by means of externally applied energy. Additive manufacturing and rapid prototyping can be performed using a laser to selectively sinter a powder by raising a temperature of a powdered material to its softening or melting point, thereby causing the particles of the powder to fuse together. The temperature used for sintering depends on the material being sintered, but, in general, higher temperatures result in faster sintering. SLS systems typically use infrared band lasers for sintering.

The term "galvanometer" and "galvo" in this specification refer to a motor which drives the mirror of a scanner. The term "scanner" refers to a single or pair of computer controlled, selectively directable mirrors arranged within a housing or main body and their respective galvanometer. The main body is configured with a first opening to receive a laser beam from a laser source and a second opening that allows that mirror(s) to direct the laser beam to a selected location or locations on a part bed. A laser source as used herein may refer to a single laser producing multiple laser beams, or alternatively, multiple laser sources each producing a laser beam, a laser source for each scanner in a system, may be used. Each scanner thus has a corresponding scan area within which its mirror(s) can direct the laser beam. The main body houses the mirror(s) and a respective drive mechanism, such as a galvanometer, for each mirror. Scanner(s) as used throughout this disclosure may refer to configurations having a single mirror and drive mechanism, and thus having single axis motion (x or y), or alternatively may also refer to a set, or pair, of scanner motors and mirrors, the set or pair including two axis motion (x and y). Of the pair of mirrors in a scanner, a first mirror is generally an "x" mirror and a second mirror is generally a "y" mirror. The first mirror is generally positionable by its respective drive mechanism to direct a laser beam in an "x" direction with respect to the second mirror, which is generally positionable by its respective drive mechanism to direct the laser beam in a "y" direction. The laser beam is thus directed in the x and y directions with respect to the surface of a part bed in a two mirror scanner, or directed in one direction, the x direction or the y direction, on the surface of the part bed in a single mirror scanner. When directed to the part bed of an additive manufacturing system, the scanners may be computer controlled and configured to receive instructions for directing each laser beam along vector or raster paths to selectively sinter or melt a layer of powder-baser material and to repeat the process in a layer-by-layer manner along a selected path for sintering.

An apparatus for laser sintering or direct metal melting of a powder-based substrate typically includes a computer or laser controller configured to direct at least one scanner to receive and direct at least one laser beam over a layer of build material. The scanners are positioned within the additive manufacturing system such that the plurality of laser beams are substantial incident on a part bed. In one embodiment of a sintering process in which multiple laser beams are utilized, the laser beams are typically operated to deposit substantially constant energy levels per unit area. The laser beam is selectively traced along each layer of build material, imparting energy thereto to form a sintered mass. The computer or controller is provided with the boundaries of the desired cross-sectional regions of the part with respect to each layer and translates these boundaries into directions which are received by a scanner for directing a laser beam. For each cross-section, or slice of the part, the laser beam is scanned over a layer of powder and the laser is switched on to sinter only the powder within the boundaries of the cross-section. Once a layer is sintered, the powder bed is incremented a single layer, and a layer of powder is applied and sintered. The process is repeated until a completed part is formed. The powder may comprise, for example, metal, ceramic, polymer or copolymer materials. The laser beam may be directed in a continuous raster scan, or alternatively in a continuous vector scan.

In general, to produce a three-dimensional part according to embodiments of the present disclosure, a thin layer of powder-based material may be dispensed evenly onto a part bed. For example, a powder dispensing system may be incorporated into the additive manufacturing system and comprise a roller to evenly dispense a layer of powder-based material across the part bed. The laser control mechanism is operated to move the laser beam(s) and to modulate the energy level per unit area of the laser beam(s) to selectively sinter a pattern in each layer of powder dispensed on the part bed. Each layer may comprise a thin or fine powder surface which is selectively scanned and sintered with the laser. A raster scan, vector scan or combination of laser scanning methods may be used. The laser beam or the laser beam(s) are directed to scan a selected path on each layer, and this process is repeated in a layer-by-layer manner. The lasers are powered to direct beams at points along the pre-determined or selected path where the powder is to be sintered (or melted). Otherwise, the laser is or powered down when scanning across the part bed.

When one layer is complete, another layer of powder is spread over the previous, now sintered layer, and the next layer is scanned. This process is repeated until the three-dimensional part is built. Thus, building the 3D object entails moving the part bed an incremental distance corresponding to a thickness of the subsequent layer (for example, lowering) in order to maintain a constant distance between the laser emitter and a top layer of the 3D object. In general, a known method and apparatus for selective laser sintering is disclosed in U.S. Pat. No. 4,863,538.

Figure 1:
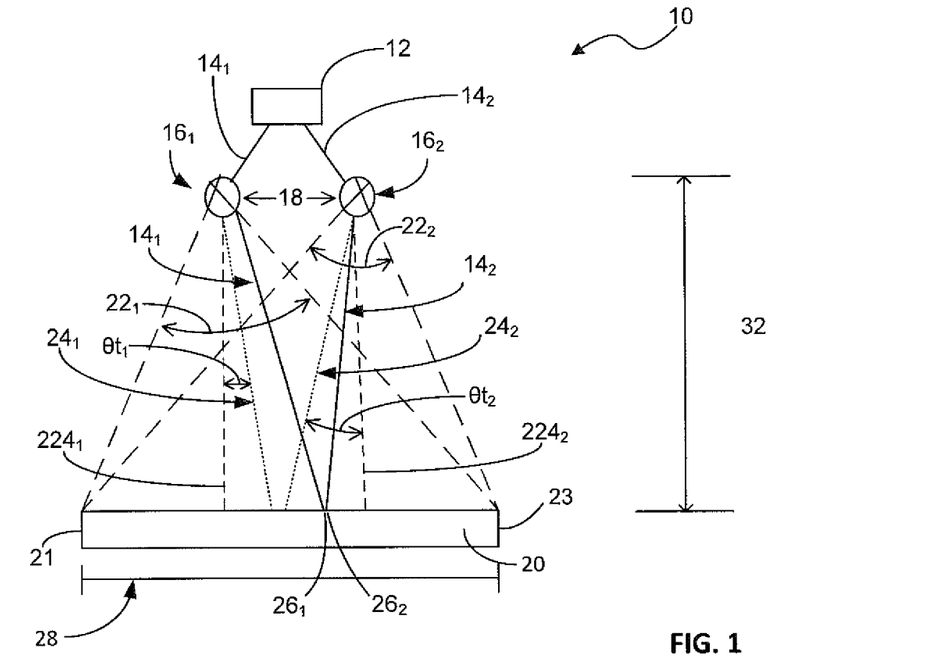
FIG. 1 illustrates components of a selective laser sintering system incorporating a plurality of scanners according to embodiments of the present disclosure.

As illustrated in FIG. 1, a laser system 10 for selective laser sintering according to an embodiment of the present disclosure comprises a laser source 12 that is capable of producing and emitting one or more laser beams $14_1$, $14_2$. The system 10 further includes a plurality of scanners $16_1$, $16_2$ where scanner $16_1$ is configured to direct a laser beam $14_1$ of the plurality of laser beams onto a layer of part bed 20, and scanner $16_2$ is configured to direct a laser beam $14_2$ of the plurality of laser beams onto a layer of part bed 20. The laser source 12 may be a single laser emitter and a corresponding optical system configured to split a first laser beam into a plurality of second laser beams for processing. Alternatively, the laser source 12 may comprise a plurality of laser emitters, each configured to concurrently emit a single laser beam in parallel, a single laser source or emitter for each scanner of a system. The laser beams $14_1$, $14_2$ are directed from the laser source 12 to the respective scanner $16_1$, $16_2$. Each scanner $16_1$, $16_2$ is configured to direct an incident laser beam $14_1$, $14_2$ within a scan area (indicated by angle $22_1$, $22_2$) on the part bed 20. Each of the scan areas generally corresponds to and covers at least a portion of the part bed 20.

Figure 4:
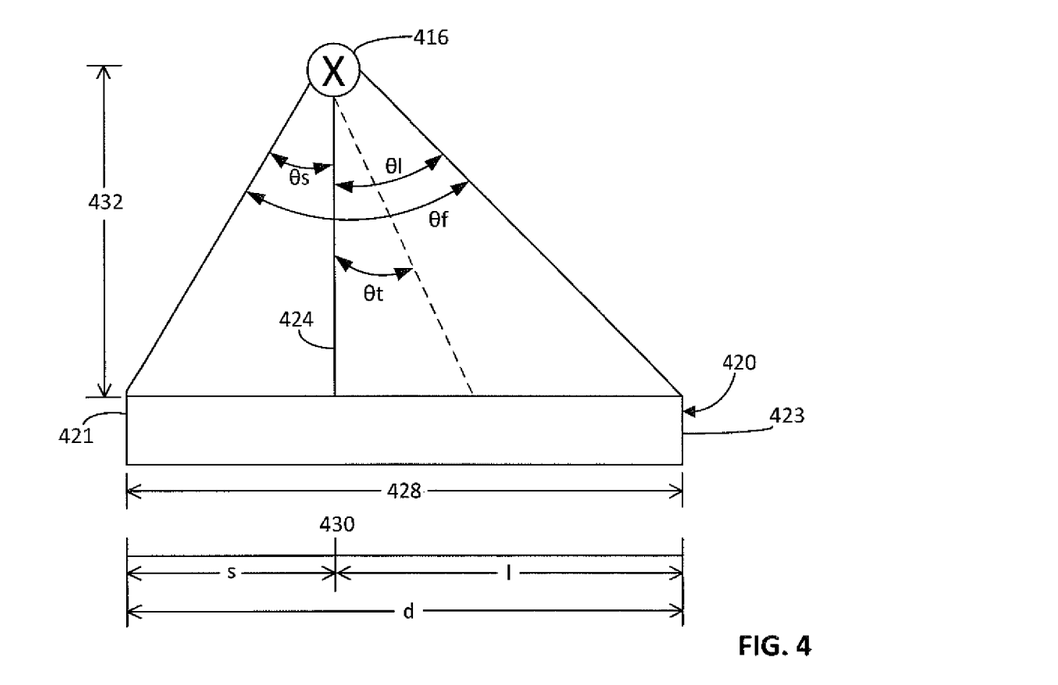
FIG. 4 illustrates schematically operation of one embodiment of a method for selecting a scanner tilt angle and reducing the distance with which a scanner is separated from a part bed when integrating one or more laser beams and scanner systems into a selective laser sintering system.

In the embodiments illustrated in FIG. 1 and FIG. 4, each scanner $16_1$, $16_2$ is configured to provide a wide cumulative scan area or field of view defined by its angle $22_1$, $22_2$. The scanners $16_1$, $16_2$ each direct a received laser beam $14_1$, $14_2$ to the part bed 20 to print a layer of the 3D part. Each scanner $16_1$, $16_2$ has a separate area, or field of view, in which it can project its laser beam $14_1$, $14_2$ onto the part bed 20. The field of view is in one embodiment the area of the part bed 20 to which the mirrors of a scanner $16_1$, $16_2$ can direct a focal point or area $26_1$, $26_2$ of the laser beam $14_1$, $14_2$ for transferring the laser energy to the material in the part bed 20. The surface area of the field of view is a function of a distance 32 between the surface of the part bed 20 and the scanner $16_1$, $16_2$. In general, as the distance 32 increases, so does the field of view.

Each laser beam $14_1$, $14_2$ and corresponding scanner $16_1$, $16_2$ is configured to direct the focal point $26_1$, $26_2$ of its laser beam $14_1$, $14_2$ along a surface area determined by the physical constraints of the scanner or scanners $16_1$, $16_2$. The scanners $16_1$, $16_2$ may be positioned adjacent to one another and oriented such that when the laser beam $14_1$, $14_2$ is directed into the scanner $16_1$, $16_2$, the focal point $26_1$, $26_2$ of the laser beam $14_1$, $14_2$ is directed along a surface of the part bed 20. The scanners $16_1$, $16_2$ are also positioned with a space 18 between the main body of each scanner $16_1$, $16_2$ sufficient for mechanical clearance, sufficient to prevent damage to the mirrors from heat effects during processing and to maintain accuracy and precision with respect to the laser beam $14_1$, $14_2$. Processing includes methods of building parts by layers, or in a sintering method or other methods described herein, such as fusing or the like. At least one laser beam from a scanner may be used in one embodiment to selectively process the material based on a sliced layer of a digital model for the thee-dimensional part.

Laser beam $14_1$ and scanner system $16_1$ have a respective field of view $22_1$ which provides a boundary to the scan area for the laser beam $14_1$, (e.g. focal point $26_1$). Laser beam $14_2$ and scanner system $16_2$ has a respective field of view $22_2$ which provides a boundary to the scan area for the laser beam $14_2$, (e.g. focal point $26_2$). In one embodiment, the fields of view $22_1$, $22_2$ overlap to subtend an entirety of the part bed 20. In another embodiment, each field of view $22_1$, $22_2$ subtends an entirety of the part bed 20. The respective fields of view are hereinafter defined generally as a scan area within the boundaries of which the respective scanner $16_1$, $16_2$ may direct the focal point $26_1$, $26_2$ of the corresponding laser beam $14_1$, $14_2$. In one embodiment, the fields of view $22_1$, $22_2$ are substantially the same and all subtend the entire part bed. Each field of view is typically a parallelogram with the wide end farthest away from the scanner. In practice, the geometry is chosen so the narrow end of the parallelogram is the width of the part bed and both fields of view subtend the entire part bed. While two lasers are illustrated and referred to, the system 10 may comprise one laser or additional lasers and scanners. The utilization of the second and any subsequent laser beams uses the addition of the second and any subsequent scanners to independently direct the subsequent laser beams to the part bed 20.

Figure 2:
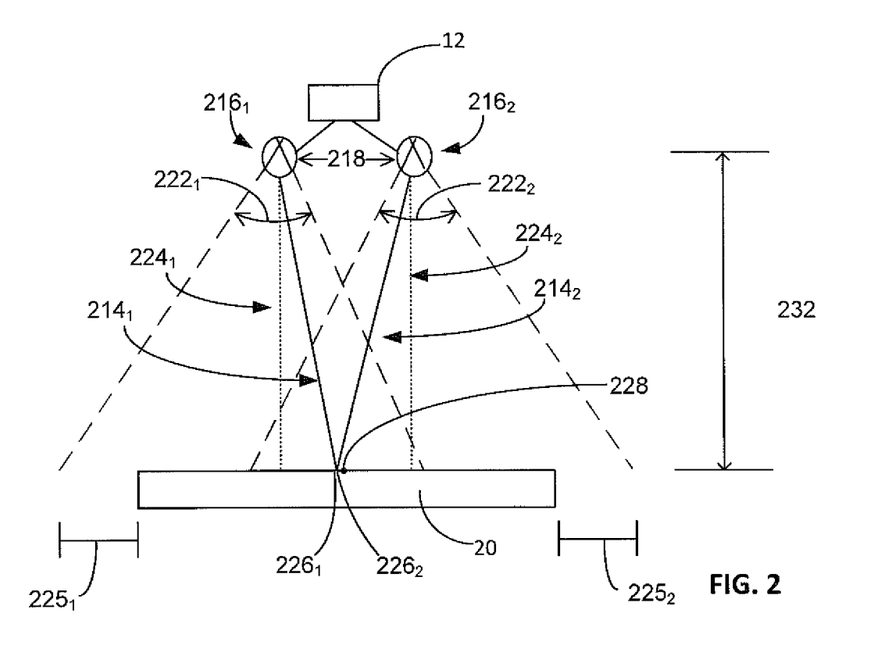
FIG. 2 illustrates a prior art arrangement of a plurality of scanner systems for use in laser processing.

Referring to FIG. 1, the scanners $16_1$, $16_2$ are positioned with respect to the part bed 20 such that a distance 32 between the part bed 20 and the scanners $16_1$, $16_2$ is sized to provide overlap between the fields of view $22_1$, $22_2$ of adjacent scanners $16_1$, $16_2$, which allows for a reduction in the distance between the scanners $16_1$, $16_2$ and the part bed 20 relative to traditional designs (with scanners $216_1$, $216_2$ and beams $214_1$, $214_2$ placed at a distance 232 between the part bed 20 and the scanners $216_1$, $216_2$ such as that shown in FIG. 2).

Referring to FIGS. 1 and 2, this size reduction (32<232) is accomplished in one embodiment by orienting the optical axes $24_1$, $24_2$ of the scanners $16_1$, $16_2$ at tilt angles $\theta t_1$ and $\theta t_2$ with respect to a standard optical axis ($224_1$, $224_2$) which is generally normal to the part bed 20. Previously, increasing a scan area of a laser incorporating a plurality of scanners that required an increase in the field of view of each galvo. The increase in the field of view was accomplished by increasing the distance between the part bed 20 and the scanner 16.

A cumulative field of view 28 includes at least the fields of view $22_1$, $22_2$ of the beams $14_1$, $14_2$ from each scanner $16_1$, $16_2$. In the embodiment illustrated in FIG. 1, the cumulative field of view 28 corresponds substantially to the area of the part bed 20, but does not extend beyond the area of the part bed 20. In one embodiment, the tilted axes $24_1$, $24_2$ of the scanners $16_1$, $16_2$ allow each scanner $16_1$, $16_2$ to subtend an entire surface area of the part bed 20 (shown as angles $22_1$, $22_2$), without substantially extending the field of view beyond the area of the part bed 20. As shown in FIG. 1, in one embodiment, scanner $16_1$ has its optical axis $24_1$ tilted at an angle $\theta t_1$ from its normal optical axis $224_1$, and scanner $16_2$ has its optical axis $24_2$ tilted at an angle $\theta t_2$ from its normal optical axis $224_2$. In this configuration, the optical axes $24_1$ and $24_2$ are pointed toward a middle of the part bed 20 relative to an apparatus in which the optical axes are normal to a surface of the part bed 20 (such as optical axes $224_1$ and $224_2$ normal to the surface of the part bed 20).

This positioning of the scanners $16_1$, $16_2$ provides a benefit to additive manufacturing systems in which the laser system 10 may be incorporated along with a reduction in the distance 32 (versus the distance 232 using scanners $216_1$, $216_2$) from the part bed 20 (e.g. substrate or part layer) to the scanner 16. This allows for reduced costs associated with the additive manufacturing system, due to a smaller machine size. Additionally, as the cumulative field of view 28 of the laser system 10 is changed to substantially that of the part bed 20, a smaller processing chamber may be used, which results in multiple increases in the speed of the process of building a three-dimensional part. For example, a smaller process chamber heats and cools faster, resulting in faster throughput. If the process chamber is a vacuum system, a smaller chamber takes less time to achieve vacuum, increasing throughput.

Referring to FIG. 2, in prior art systems using single axis scanners $216_1$, $216_2$ with adjacent fields of view, traditional optical axes $224_1$, $224_2$ are normal to the part bed 20. The fields of view $222_1$, $222_2$ will not necessarily overlap depending on the orientation of the mirror along its axis $224_1$, $224_2$. If both scanners $216_1$, $216_2$ are configured to scan the entire area of the part bed 20, this would require a larger separation (height distance 232) between the part bed 20 and the scanners $216_1$, $216_2$ relative to the system illustrated in FIG. 1. As the normal optical axes $224_1$, $224_2$ of the scanners $216_1$, $216_2$ are off center from a center point 228 of the part bed 20, their positioning produces a field of view $222_1$, $222_2$ of each scanner $216_1$, $216_2$ with an amount of wasted scan area for the adjacent scanners, shown as scan areas $225_1$, $225_2$ beyond the part bed 20.

In an embodiment of the present disclosure, generally illustrated in FIG. 1, the scanners $16_1$, $16_2$ are also positioned with their optical axes $24_1$, $24_2$ oriented at an angle not normal to the part bed 20 and typically within range of about 2° to about 60°. In one embodiment, a scanner angle for directing a laser beam through the field of view is about 40° and thus has a ±20° mirror swing. While two scanners $16_1$, $16_2$ can be positioned to increase the cumulative field of view with respect to an increased part bed size 28, the scanners $16_1$, $16_2$ are typically tilted toward each other to allow overlap between the respective fields of view $22_1$, $22_2$ of the tilted scanners $16_1$, $16_2$ over the part bed 20. Constructional and operational constraints (such as but not limited to scanner size; main body size; heat generated by the laser during operation affecting the mirrors and the laser focus) limit the spatial positioning of multiple scanners $16_1$, $16_2$ across a part bed 20 in a single system, requiring the scanners $16_1$, $16_2$ to be separated from one another a sufficient distance 18 to maintain the functionality and integrity of the scanners $16_1$, $16_2$. While two scanners $16_1$, $16_2$ are discussed herein, it should be understood that additional scanners 16 could be employed using additional laser beans 14 and/or lasers 12 without departing from the scope of the disclosure.

The plurality of synchronized laser beams $14_1$, $14_2$ and corresponding scanners $16_1$, $16_2$ further allows for an improved build quality of the 3D part. In printing a 3D part with an additive manufacturing system where one or more layers of the 3D part may require laser sintering along a build path that spans the width of the part bed 20 or where the build path traverses multiple areas of view on the part bed 20, it is impractical for a single scanner and laser system to scan the entire area.

Figure 3A:
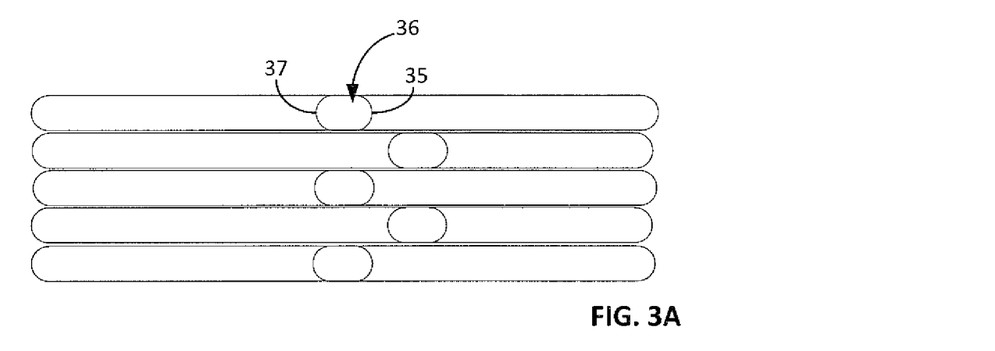
FIG. 3A illustrates the interleaved scanning methods and resulting joints of the prior art laser sintering systems.

It is generally known to incorporate a second scanner and laser system that is not synchronized with the first scanner and laser system, and to do so requires the distance between the scanner and the part bed to be increased. While a plurality of unsynchronized lasers and scanners may be used to produce a 3D part in a layer-by-layer process, the laser scans are interleaved within each layer such as those illustrated in FIG. 3A. Interleaved scans are utilized to join part layers that span across opposing sides or different areas of the part bed. The interleaved scan is used as a method to link two or more laser scan areas together and joints 36 are formed between where the first scan ends 35 and the second scan begins 37. This interleaving can cause degradation in part quality due to, for example, internal strain, and differing mechanical properties at the joints 36.

Figure 3B:
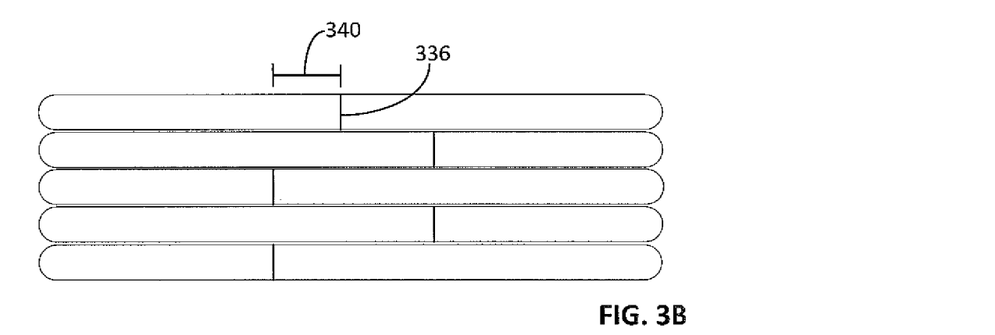
FIG. 3B illustrates a synchronized scanning method and resulting joints according to an embodiment of the present disclosure.

A method of scanning a layer of each part with one or embodiments of system 10 as disclosed herein may instead utilize the plurality of scanners $16_1$, $16_2$ and lasers $14_1$, $14_2$ in a synchronized manner. The 3D part can be selectively sintered in a layer-by-layer manner allowing each laser scan line (laser path) in the part bed 20 to be drawn with continuous application of laser energy from one side of the part bed 21 to another side 23. As shown in FIG. 3B, to accomplish this, the laser beams $14_1$, $14_2$ and scanners $16_1$, $16_2$ are oriented such that when the edge of a first scan area 336 scanner $16_2$ and laser beam $14_2$ continues the scan from the edge 336 of the first area to a second edge of a second scan area within the second field of view. The laser path spans the cumulative field of view 28, where multiple lasers are configured to scan the laser path in a manner that applies continuous laser energy to the part material along a path. The lasers are synchronized such that an adjacent laser beam of a consistent energy level per unit area begins laser sintering in a synchronized fashion after the first laser beam reaches a limit in its field of view on the part view overlap.

In one embodiment, the second laser beam $14_2$ is configured to trace at least a portion of a path with the first laser beam $14_1$ for at least a selected distance 340 along the layer of the part. This selected distance is at least a portion of the laser path that is near or within an overlapping area of two adjacent fields of view $22_1$, $22_2$. In one embodiment, the scanners $16_1$, $16_2$ may be oriented such that the fields of view $22_1$, $22_2$ substantially overlap and cover the part bed 20. In this configuration, the second laser beam $16_2$ is configured to continue processing the same path within the second field of view $22_2$. If the path continues across multiple fields of view or traverses back and forth over two adjacent fields of view, the laser beams $14_1$, $14_2$ are configured for synchronization at and through each overlapping area projected on the part bed 20 to provide consistent sintering along each path.

The 3D part is printed layer-by-layer as if a single scanner 16 and laser 12 were being used to process each path of each layer of the three-dimensional part and configured with a field of view substantially equal to or greater than the area of the entire part bed. Synchronization of scanners and lasers assists in eliminating or reducing issues with joints 36 and the different mechanical properties present at a joint of a laser path processed independently by two non-synchronized lasers. Eliminating the joint in larger parts allows large direct metal laser sintering (DMLS) machines to produce three-dimensional parts in a faster manner and with increased part quality even when the melt pool cool-down time is short.

In another embodiment, the laser beams 14 may be synchronized for selectively pre-heating and sintering the powder-based build material 30 in a layer-by-layer manner. The plurality of laser beams 14, whether generated from a single laser source 12 or a plurality of laser sources, may each have substantially equal laser energy level per unit area or substantially the same optical energy. Alternatively, each laser beam 14 may have an unequal energy. The optical energy of each laser beam 14 in the plurality of laser beams may be selected based on factors including, but not limited to, part material composition and/or melt-temperature. The plurality of laser beams 14 may comprise at least one laser beam utilized as a "pre-heating" laser beam and at least one other laser beam utilized as a sintering laser beam.

Figure 5A:
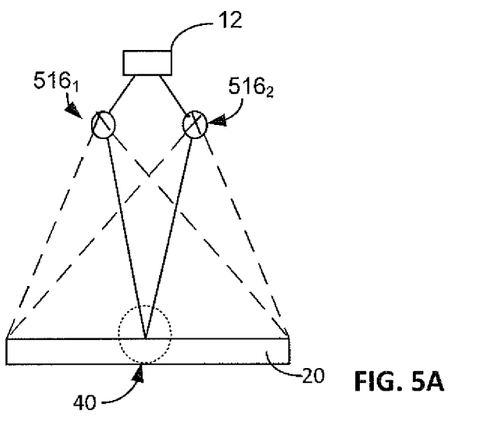
FIG. 5A illustrates a configuration of a pre-heat and a melt laser embodiment of a selective laser sintering system.
Figure 5B:
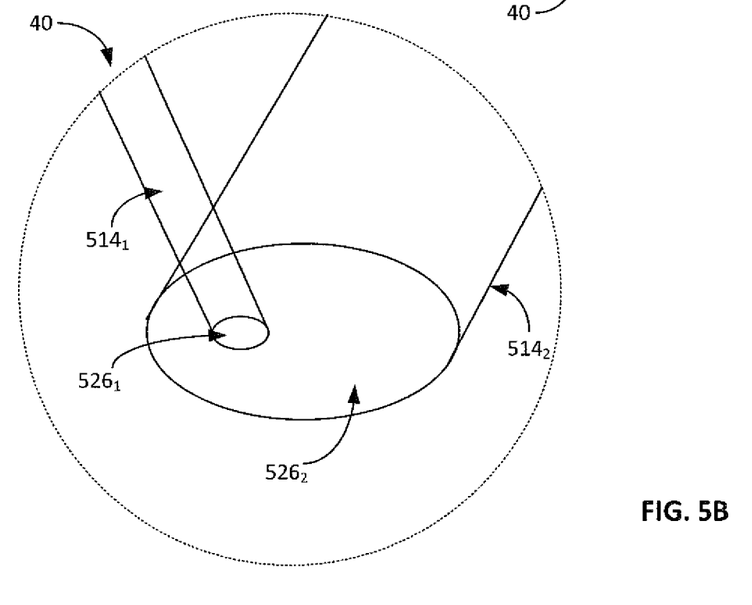
FIG. 5B is an enlarged view of the preheat and the melt laser beams schematically illustrated in FIG. 5A.

For example, as illustrated in FIGS. 5A and 5B (showing an enlarged portion 40 of FIG. 5A), a lower powered laser beam $514_1$ (a lower energy level per unit area) may be used to melt the powder-based build material and be synchronized with a higher powered laser beam $514_2$ (a higher energy level per unit area) used to pre-heat the powder-based build material. The powder-based material in region $526_1$ that is incident with the sintering laser beam $514_1$ is heated and fused together. The areas not incident with the sintering laser beam $514_1$ (or incident with the pre-heat laser beam $514_2$ as indicated at region $526_2$) remain loose and falls from the 3D part as it is removed from the additive manufacturing system. Successive layers of powder-based build material are deposited and raster-scanned or vector scanned in a layer-by-layer manner according to the selected shape of the three-dimensional part, until the entire 3D part is built. Each layer is sintered deeply enough to sufficiently bond it to the preceding layer.

In this process, a first laser $516_2$ emits a pre-heat laser beam $514_2$ having a spot size $526_2$ where the first laser $514_2$ is configured to provide a first energy (based on laser power and/or wavelength) sufficient to pre-heat, but not melt or sinter, the selected powder-based build material in the area, or spot size $526_2$, of the beam $514_2$ for subsequent sintering. A second scanner $516_1$ emits a laser beam $514_1$ having a spot size $526_1$ and sufficient energy to sinter or melt the particles in a part bed 20. The lasers beams $514_2$, $514_1$ together are configured to pre-heat $514_2$ and subsequently sinter $514_1$ the powder-based material along a selected pattern in a layer-by-layer manner. The first, pre-heat laser beam $514_2$ may have a different spot size $526_2$ than the second, melt beam spot size $526_1$. For example, the first laser beam $514_2$ for pre-heating the powder material may have a beam spot size $526_2$ larger in size than the second laser beam spot size $526_1$.

In one embodiment, the beams $514_2$, $514_1$ are synchronized to move in a scan direction to apply the pre-selected optical energy to the powder-based material in the part bed 20 along a selected path. The scanners $516_2$, $516_1$ are controlled in one embodiment to direct the beams along a same vector or raster path to form each layer of the three dimensional part where the beam $514_1$ closely follows the beam $514_2$. In one embodiment, the smaller beam $514_1$ may be positioned and controlled to move along the laser scan path within the area of the larger beam $514_2$. This allows the material layer to be pre-heated and subsequently sintered without substantially cooling down. Thus, the area is pre-heated and subsequently melted in a synchronous manner. The beams $514_2$, $514_1$ are, in one embodiment, each moved along a similar or same pattern on a similar or same tool path. In other embodiments, the pre-heat beam $514_2$ moves in a different pattern and/or along a different tool path than the melting beam $514_1$. For example, in a raster scan fill, the preheat beam $514_2$ may be one or more raster lines ahead of the melting beam $514_1$. The preheat beam $514_2$ can also either lead or lag the melt beam $514_1$ along the beam path, without departing from the scope of the disclosure.

Still further, different tool paths are used in one embodiment for the preheat beam and melt beam, for example to tailor a time response of the system for reduced strain. For example, the preheat beam in one embodiment may start its path outside the part area. The melt beam then is turned on when the preheat beam gets inside the part area. Further variations of different tool paths for the preheat and melt lasers are within the scope of one skilled in the art, and are within the scope of the present disclosure.

While powder-based materials and SLS processes are described herein, it should be understood that stereolithography-based (SLA) processes may also be used with the embodiments of the present disclosure. SLA processes use photocurable polymers in a partial form or a liquid form, and use a laser or lasers sufficient to fuse the photocurable polymer in a similar fashion to the fusing of the powder-based materials of SLS processes. SLA systems typically use ultraviolet band lasers for fusing/curing.

In printing or building a three-dimensional part with a laser system 10 according to embodiments of the present disclosure, one method involves slicing a digital model of a desired 3D part into thin layers (e.g., less than about 100 micrometers in thickness). The scanners $16_1$, $16_2$, which are oriented and positioned at a selected tilt angle $22_1$, $22_2$ from a normal optical axis with respect to the part bed 20, are computer controlled to direct the laser beams along a selected path for sintering. The tilt angle of the scanners $16_1$, $16_2$ is determined based in part on the area of the part bed 20. The scanner $16_1$, $16_2$ orientation is configured to reduce the distance 32 between the scanners $16_1$, $16_2$ and the part bed 20 while providing a sufficient overlap in the field of view $22_1$, $22_2$ of the respective scanner $16_1$, $16_2$. The sliced layers may then be laser processed to sinter or melt a layer of a 3D part. For example, during a printing operation, layers of powder-based plastics or metals are sequentially spread or otherwise distributed onto the part bed 20 with a coating mechanism of the system, preferably in an inert gas atmosphere (e.g., argon or nitrogen) or in a vacuum.

Incorporating a laser sintering system such as system 10 described herein and the plurality of laser beams $14_1$, $14_2$ and corresponding scanners $16_1$, $16_2$ as described herein into an additive manufacturing system increases build speed and the overall integrity of the 3D part, as the laser beams $14_1$, $14_2$ are synchronized to uniformly sinter each layer and to eliminate joints or weak spots. Without synchronizing the laser beams $14_1$, $14_2$, the 3D part printed has an indeterminate build quality due at least in part to the highly time-dependent nature of the SLS/DMLS processes. To increase part quality and account for the time considerations in melting and cooling the powder based build material, methods of selective laser sintering previously utilized a "cooling time" between laser passes when processing each layer, thus increasing the build time (e.g. decreasing build speed). The cooling time between laser passes produces joints 36 formed where the first laser paths ends and the layer cools before the second laser pass subsequently begins.

With respect to the embodiments described herein, the system 10 having a computer-controlled laser source 12 with corresponding scanners $16_1$, $16_2$ to selectively focus and direct the laser beams $14_1$, $14_2$ onto each powder layer, may be incorporated into an additive manufacturing system of various design. The scanners $16_1$, $16_2$ are in one embodiment computer controlled and configured to direct each laser beam $14_1$, $14_2$ along a path or laser pattern defined by the area of sliced layers relating to the shape of the 3D part. The laser beam(s) melt or sinter the powder to form a solidified part geometry or solid weld for each layer. This process can then be repeated for each successive layer to print the 3D part, allowing a variety of complex geometries to be built, including various external geometries and for example, organically-shaped internal passageways.

The use of a plurality of beams $14_1$, $14_2$ further improves a heat profile in the part bed 20. Typically, improving the heat profile of the part bed 20 is done with a single set of scanners $16_1$, $16_2$ and a complex set of optics configured to produce a desired heat intensity profile. In one embodiment of the present disclosure, a plurality of, for example, two or more synchronized scanners $16_1$, $16_2$ and laser beams $14_1$, $14_2$ with focal points $26_1$, $26_2$, are utilized such that the heat profile of the part bed 20 can be dynamically varied in order to produce both time and spatial heat distributions which allow for the printing of three-dimensional parts with reduced internal strain. The reduction in internal strain produces higher quality parts and reduces the need for internal and/or external support structures for metal systems and parts and further enables the system to produce larger, more complex three-dimensional parts.

In one embodiment, a plurality of laser sources 12 are used in a system (e.g., systems 10, 46). The plurality of laser sources include a laser source such as source 12 having a single laser emitter or a plurality of laser emitters, or multiple independent laser sources also having a single laser emitter of a plurality of laser emitters. The multiple independent laser sources are in some embodiments located at different heights from a part bed 20. The multiple independent laser sources in one embodiment produce the same or different energies, the same or different wavelengths, are of the same or of different laser types, and/or have the same or different spot sizes. Combinations of different laser sources provide in one embodiment a system capable of operating with multiple different materials including different composites, materials that are excited by different wavelengths, and the like.

Scanners such as scanners 16 used to direct laser beams 14 from laser sources 12 are also used in some embodiments in quantities greater than two. This plurality of scanners may also be positioned at different heights above a part bed 20 in systems such as systems 10, 46. This configuration allows for a broad range of scanning paths and materials. The plurality of laser sources 12 and multiple laser beams 14 expand the capabilities of systems 10, 46 to additional materials, part geometries, and the like.

In one embodiment, the laser sources 12 are operated, at least for some portion of part building, in a pulsing fashion. That is, the laser sources pulse on and off instead of operate continuously. This pulsing may be used for all laser sources 12 in a system (e.g., systems 10, 46), or for some of a plurality of laser sources 12, or for no laser sources in a system, depending upon the part being built, the materials being used, and the like.

Pulsing of laser sources may be used during part build, during post build processing, or a combination thereof. Pulsing the laser sources, instead of providing a continuous output, can provide certain advantages in the processes described herein. For example, pulsing of laser sources reduces the total energy input into a part versus a part built with continuous laser power. Therefore, less overall heat builds up in the part. With less heat built up in the part, the part cools more quickly, and therefore there are fewer potential issues with that latent heat causing issues with a finished part.

Figure 6:
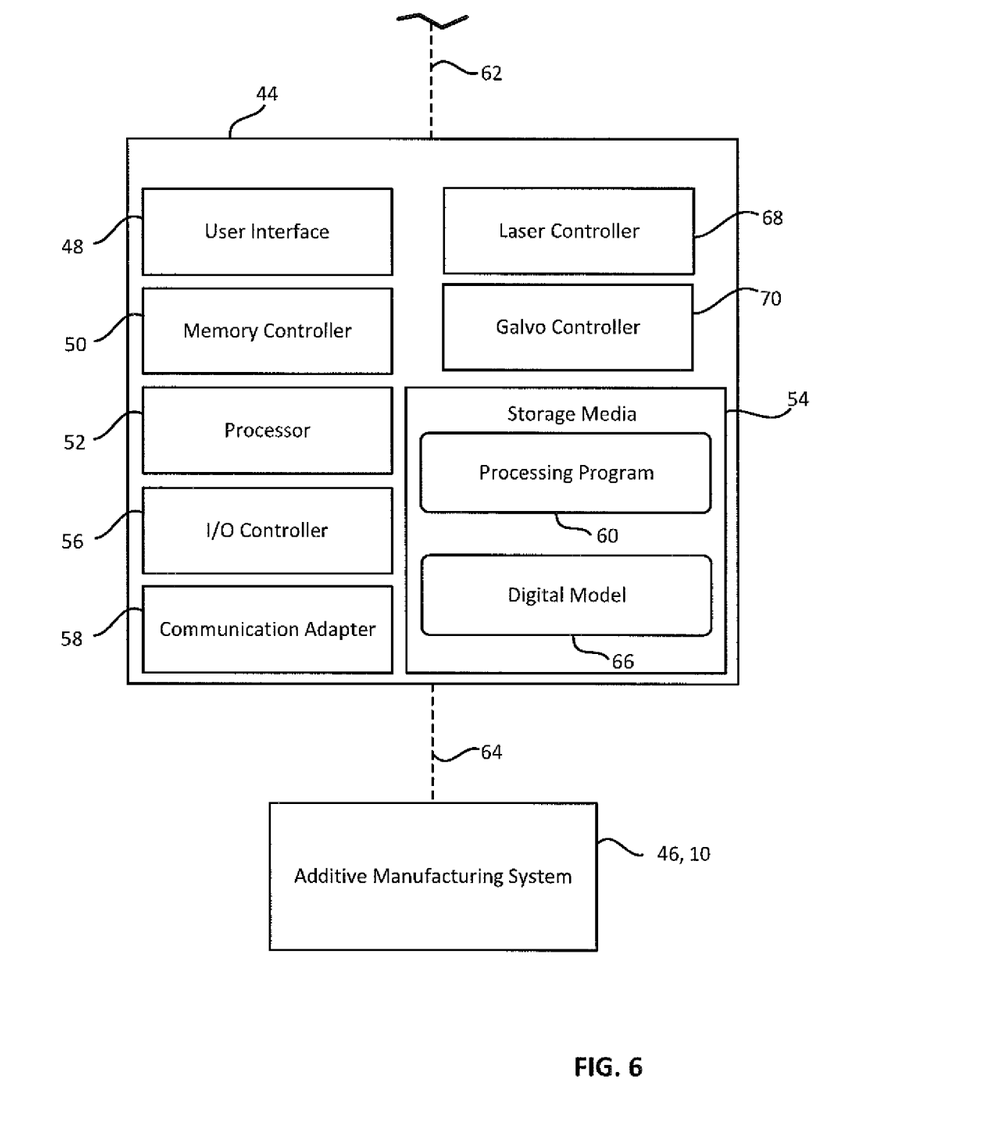
FIG. 6 illustrates a control system of an additive manufacturing system and method of building a three-dimensional part with the selective laser sintering system according to an embodiment of the present disclosure.
Figure 7:
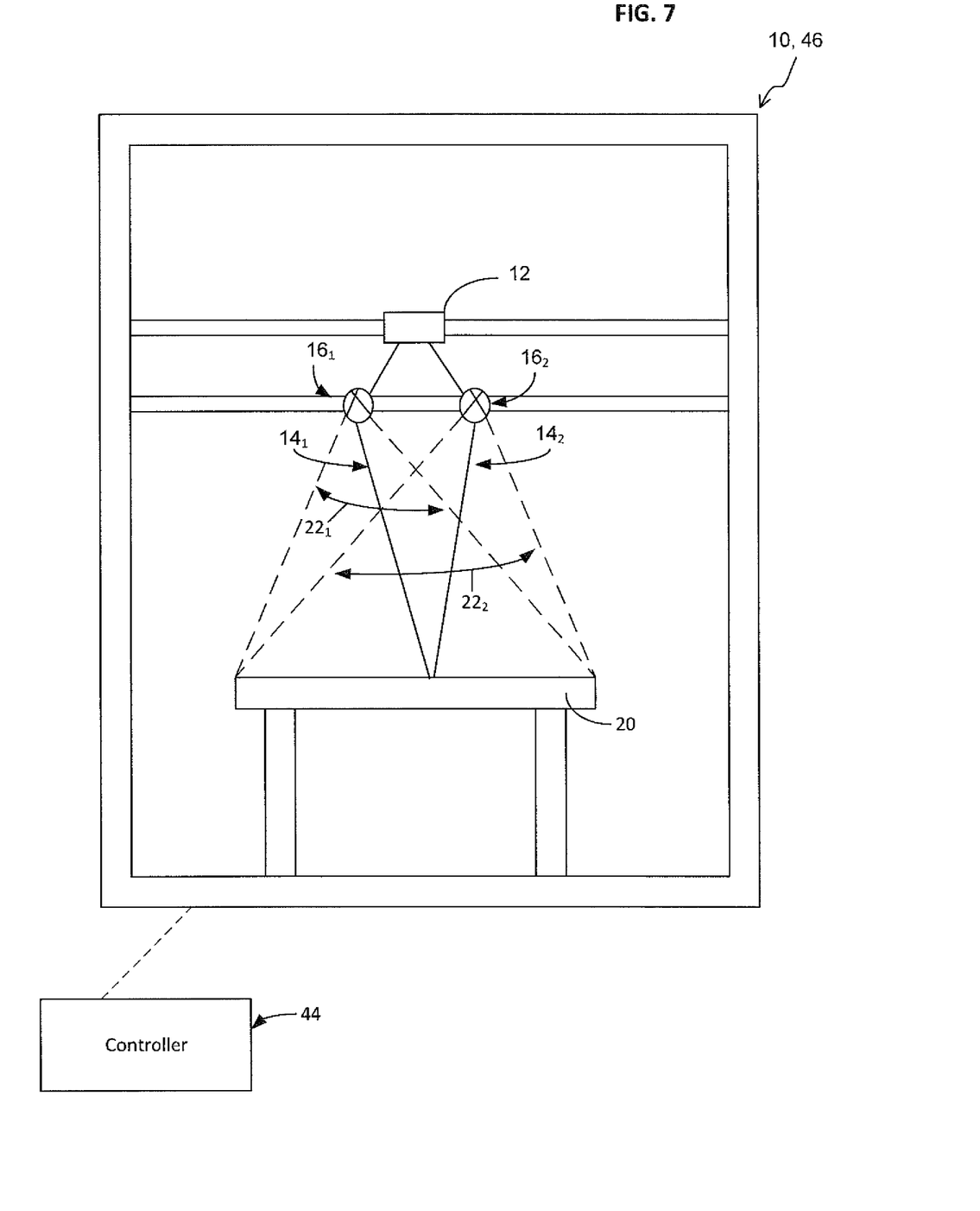
FIG. 7 illustrates a schematic selective laser sintering system as incorporated into an additive manufacturing system according to an embodiment of the present disclosure.

Further, the laser sources are in one embodiment operated in a pulsed mode post heating the part material to a temperature below the melting or fusing temperature. Pulsing the laser energy is done in one embodiment to modify an energy profile of the part. This energy profile modification can make additional print layers more likely to be successfully built. Further, modification of the energy profile of a part using pulsed laser sources reduces the overall temperature of the part, which has its own advantages. By way of example only and not by way of limitation, advantages to controlling the energy profile of a part using pulsed laser sources includes reduction of evaporation when printing with alloys, controlling the micro-structure of the part, and randomizing the crystalline structure of the printed part to create an amorphous structure that has strength in all directions. For example, by controlling a temperature at which a part cools, or an energy profile of the part on cooling, the structure of the part may be determined or affected. Instead of a part that has structure that is aligned in a single direction, managing the energy profile allows for solidification of a part in a random crystal pattern, so that an isotropic part with no directional bias results. As illustrated in FIGS. 6-7, a computer 44 capable of controlling operation of an additive manufacturing system 46 (such as system 10 described herein) may include any suitable computer-based hardware, such as user interface 48, memory controller 50, processor 52, storage media 54, input/output (I/O) controller 56, and communication adapter 58. Computer 44 may also include a variety of additional components that are contained in conventional computers, servers, media devices, signal processing devices, and/or printer controllers.

User interface 48 is one or more user-operated interfaces (e.g., keyboards, touch pads, touch-screen displays, display monitors, and other eye, voice, movement, or hand-operated controls) configured to operate computer 44. The interface 48 operably interconnects the computer 44 with the laser source 12 and scanners $16_1$, $16_2$ of an additive manufacturing system 46. Memory controller 50 may comprise one or more circuit assemblies that interface the components of computer 44 with one or more volatile random access memory (RAM) modules of storage media 54. Processor 52 is one or more computer-processing units configured to operate computer 44, optionally with memory controller 50, and preferably with related processing circuitry (e.g., programmable gate arrays, digital and analog components, and the like). For instance, processor 52 may include one or more microprocessor-based and/or microcontroller-based units, one or more central processing units, and/or one or more front-end processing units.

Storage media 54 is one or more internal and/or external data storage devices or computer storage media for computer 44, such as volatile RAM modules, read-only memory modules, optical media, magnetic media (e.g., hard disc drives), solid-state media (e.g., FLASH memory and solid-state drives), analog media, and the like. Storage media 54 may retain one or more pre-processing and/or post-processing programs 60 for generating digital models for internal and external part geometry, for slicing the digital models, and for generating tool path instructions for the scanners 16 to direct the laser beams 14 and to selectively sinter each layer of the 3D part and/or support structure by moving the lasers along the selected tool path.

I/O controller 56 is one or more circuit assemblies that interface memory controller 50, processor 52, and storage media 54 with various input and output components of computer 44, including user interface 48 and communication adapter 58. Communication adapter 58 is one or more wired and/or wireless transmitter/receiver adapters configured to optionally communicate with one or more external computers (not shown) over one or more communication lines 62, and to communicate with additive manufacturing system(s) 46 over one or more communication lines 64. The commands from computer 44 to the components of systems 46 may be performed with one or more of user interface 48, memory controller 50, processor 52, storage media 54, input/output (I/O) controller 56, communication adapter 58, and/or other suitable hardware and software implementations, as is understood by those skilled in the art.

During use, storage media 54 may receive and retain one or more data files of digital models to be printed with system(s) 46, such as digital model 66. Computer 44 may then use processing program 60 to slice digital model 66 into sliced layers, generate laser paths for each sliced layer (and optionally for any support structures) including directions for laser controller 68 and scanner controller 70 and transmit the resulting laser tool path instructions to a system 46 to print a 3D part. While laser controller 68 and scanner controller 70 are shown separately, a combined laser/scanner controller is also amenable to use with the embodiments of the present disclosure without departing from the scope thereof.

EXAMPLES

The present disclosure is more particularly described in the following examples that are intended as illustrations only, since numerous modifications and variations within the scope of the present disclosure will be apparent to those skilled in the art.

Example 1

Referring to FIG. 1, positioning and orienting at least one scanner 16 according to an embodiment of the present disclosure produces a corresponding scan area. When a plurality of scanners are incorporated, a cumulative field of view 28 comprises the multiple scan areas of the plurality of scanners 16$_1$, 16$_2$. Orienting the scanners 16$_1$, 16$_2$ with their optical axes 24$_1$, 24$_2$ tilted from a normal orientation to the part bed 20 can produce a cumulative field of view which does not extend beyond the part bed, or otherwise substantially matches the surface area of the part bed 20.

For instance, a part bed 20 having a width of approximately 300 mm employs in one embodiment at least one scanner 16 positioned such that its optical axis 24 is tilted towards a center of the part bed 20 approximately 7.45° from a line normal to the part bed 20. When two scanners 16$_1$, 16$_2$ are incorporated, the scanners 16$_1$, 16$_2$ may each be tilted "inwardly" towards the center of the part bed 20 such that each scanner 16$_1$, 16$_2$ has an optical axis 24$_1$, 24$_2$ tilted from an axis normal to the part bed 20. The tilt angle θ is determined in one embodiment as function of the size of the part bed 20 and the distance 32 from the part bed 20. Determination of the scanner 16$_1$, 16$_2$ position and orientation with respect to a part bed 20 may be determined according to Equation 2 below.

The calculations below refer to FIG. 4, and for a part bed having a length d (or width) of 300 mm. For calculation purposes, assume an angle of the field of view θf of a scanner 416 to be θf=40° where the scanner 416 is positioned at position 430 along the length d of the part bed 420 that is off-set from the center of the part bed 420. The scanner 416 has a ±20° swing for the lateral lengths of the part bed to each side of the scanner (e.g. a short length s and a long length l). If the position dl is 99 mm from one edge of the part bed, then s=99 mm, and l=201 mm. An angle θt of tilt required can be represented with respect to short side field of view θs and long side field of view θl where $$\theta s = 20° - \theta t \text{ and } \theta l = \theta t + 20° \quad \text{(Equation 1)}$$

The tilt angle is found most easily by numerically solving the following equation for θt, given cumulative field of view distance $d_{428}$, offset distance $d_{off}$, and θf:

$$\frac{\frac{d_{428}}{2} - \left(\frac{d}{2} - s\right)}{\tan\left(\frac{\theta f}{2} - \theta t\right)} = \frac{\frac{d_{428}}{2} + \left(\frac{d}{2} - s\right)}{\tan\left(\frac{\theta f}{2} + \theta t\right)} \quad \text{(Equation 2)}$$

The closed form solution for this equation is bivalued:

$$\left[\theta t = -\arctan\left(\frac{d\tan\left(\frac{1}{2}\theta f\right)}{4\left(\frac{d}{2} - s\right)} - \frac{d}{4\left(\frac{d}{2} - s\right)\tan\left(\frac{1}{2}\theta f\right)} + \frac{\sqrt{d^2\tan\left(\frac{1}{2}\theta f\right)^4 + 2d^2\tan\left(\frac{1}{2}\theta f\right)^2 - 16\left(\frac{d}{2} - s\right)^2\tan\left(\frac{1}{2}\theta f\right)^2 + d^2}}{4\left(\frac{d}{2} - s\right)\tan\left(\frac{1}{2}\theta f\right)}\right)\right]$$

and $$\left[\theta t = \arctan\left(\frac{d\tan\left(\frac{1}{2}\theta f\right)}{4\left(\frac{d}{2} - s\right)} + \frac{d}{4\left(\frac{d}{2} - s\right)\tan\left(\frac{1}{2}\theta f\right)} + \frac{\sqrt{d^2\tan\left(\frac{1}{2}\theta f\right)^4 + 2d^2\tan\left(\frac{1}{2}\theta f\right)^2 - 16\left(\frac{d}{2} - s\right)^2\tan\left(\frac{1}{2}\theta f\right)^2 + d^2}}{4\left(\frac{d}{2} - s\right)\tan\left(\frac{1}{2}\theta f\right)}\right)\right]$$

In the example discussed above, a scanner 416 is positioned at a height 432 above the part bed 420 and over the part bed 420 at a lateral distance of 99 mm from a lateral edge 421 of the part bed 20 and 201 mm from an opposing lateral edge 423. The total area that is within the cumulative field of view 428 of the scanners 416 but outside of the area of the part bed 420 (e.g. "wasted scan area") is reduced, if not eliminated by tilting the scanner 416 inwardly by about 7.45° with respect to a perpendicular optical axis 424. The vertical distance between the scanner 416 and the part bed 420 would be approximately 404 mm.

Referring to FIGS. 1 and 4, the part bed to scanner spacing 32, 432 can be reduced by as much as approximately 30% using scanners 16$_1$, 16$_2$, 416 mounted with a tilted optical axis 24$_1$, 24$_2$; 424. In contrast, prior art systems as illustrated in FIG. 2 position the part bed at a greater distance 232, for example about 577 mm from the scanners to accomplish a cumulative scanning area over the same 300 mm part bed. Thus, in the example, a height reduction of approximately 173 mm in a height of a system may be realized.

Example 2

Referring to FIGS. 5A and 5B, the spot sizes of the beams 514$_1$ and 514$_2$, and thus the area of the powder layer that is pre-heated (526$_2$) and melted (526$_1$) may be determined based on powder composition, 3D part specifications, laser power and other system considerations. The pre-heating laser may be configured with a beam 514$_2$ having a spot size 526$_2$ in the range of about 5 mm and about 20 mm. The melt laser may be configured with a beam 514$_1$ having a spot size 526$_1$ that is substantially about the size of the pre-heat laser beam spot size $526_2$ or that is smaller in size than the pre-heat laser beam spot size $526_2$. The melting laser spot size $526_1$ may be in the range of about 25 µm and about 250 µm in diameter, and more preferably about 100 µm in diameter.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed:

1. A method of additive manufacturing for building a three-dimensional part in a part bed, the method comprising:
   providing a first scanner having a first field of view of the part bed;
   providing a second scanner having a second field of view overlapping the first field of view of the part bed and wherein the first and second scanners are positioned above the part bed;
   applying a layer of one or more powder-based materials onto or over the part bed;
   providing a laser source for each scanner, each laser source configured to produce a laser beam and direct its laser beam to each corresponding scanner;
   directing a first laser beam from the first scanner to pre-heat the powder-based material to a temperature near but below its melting temperature based on a sliced layer of a digital model for the three-dimensional part along a first tool vector path in a first selected pattern; and
   directing a second laser beam from the second scanner to melt the pre-heated powder-based material along a second tool vector path in a second selected pattern to produce a layer of the three-dimensional part.

2. The method of claim 1, wherein the first tool vector path and the second tool vector path are the same.

3. The method of claim 1, and further comprising using different tool vector paths for the first laser beam and the second laser beam to tailor time response for reduced strain.

4. The method of claim 1, wherein the first selected pattern and the second selected pattern are the same.

5. The method of claim 1, wherein the first laser beam has a first spot size, and the second laser beam has a second spot size.

6. The method of claim 5, wherein the first spot size and the second spot size are the same.

7. The method of claim 5, wherein the first spot size is larger than the second spot size.

8. The method of claim 1, wherein directing a laser beam from the first scanner and directing a laser beam from the second scanner comprises directing the laser beams along the same tool vector path.

9. The method of claim 1, wherein directing a laser beam from the first scanner and directing a laser beam from the second scanner comprises directing laser beams of a different spot size along their respective tool vector paths, and wherein the first and the second tool vector paths are the same.

10. The method of claim 6, wherein the first laser beam has a spot size larger than a spot size of the second laser beam.

11. The method of claim 5, wherein the first spot size has a diameter and range of about 5 mm and about 20 mm, and the second spot size has a diameter in a range of about 45 micrometers and about 250 micrometers.

12. The method of claim 1, wherein each of the first and the second laser beams have a spot size, each spot size being different, and further comprising directing the first and the second laser beams to scan along the first and the second tool vector paths, wherein the first and the second tool vector paths are the same, of the slice layer substantially concurrently, the second laser beam spot size being smaller than the first laser beam spot size.

13. The method of claim 1, wherein the powder-based material comprises a plastic.

14. The method of claim 1, wherein the powder-based material comprises a metal.

15. An additive manufacturing system, comprising:
   a plurality of laser sources to generate at least a first laser beam and a second laser beam;
   a part bed having material deposited therein in consecutive layers which is solidifiable by the application of laser energy in accordance with cross-sections of an object to be generated;
   a first scanner to receive the first laser beam and to direct the first laser beam along a first selected vector pattern which corresponds to a cross-section; and
   a second scanner to receive the second laser beam and to direct the second laser beam along a second selected vector pattern which corresponds to a cross-section;
   wherein the first laser beam is at a first energy level per unit area sufficient to pre-heat powder-based material in the part bed to a temperature near but below its melting temperature, and
   wherein the second laser beam is at a second energy level per unit area sufficient to melt the pre-heated powder-based material to form a layer of the part.

16. The additive manufacturing system of claim 15, wherein the first laser beam has a first spot size, and the second laser beam has a second spot size.

17. The additive manufacturing system of claim 16, wherein the first spot size and the second spot size are the same.

18. The additive manufacturing system of claim 16, wherein the first spot size is larger than the second spot size.

19. A method of additive manufacturing for building a three-dimensional part in a part bed of an apparatus for layer-wise buildup of an object using material which is solidifiable by the application of laser energy in accordance with cross-sections of an object to be generated, the method comprising:
   providing a first scanner having a first field of view of the part bed;
   providing a second scanner having a second field of view overlapping the first field of view of the part bed;
   a. applying a layer of powder-based material onto the part bed;
   b. providing at least one laser source configured to produce a laser beam and direct its laser beam to each corresponding scanner;
   c. directing a first laser beam from the first scanner to pre-heat the powder-based material based on a sliced layer of a digital model for the three-dimensional part along a first vector path in a first selected pattern corresponding to a cross-section, where pre-heating is to a temperature and state below that sufficient to fuse the material; and
   d. directing a second laser beam from the second scanner to fuse the pre-heated powder-based material along a second vector path in a second selected pattern corresponding to a cross-section; and repeating steps a through d to produce a three-dimensional part.

20. The method of claim 19, wherein an area of the part bed covered by the second scanner is entirely within an area of the part bed covered by the first scanner.

21. The method of claim 19, wherein two laser sources are provided, one for each scanner.

* * * * *